United States Patent
Wu (10) Patent No.: US 12,255,745 B2
(45) Date of Patent: Mar. 18, 2025

(54) DATA TRANSMISSION METHOD USING HYBRID AUTOMATIC REPEAT REQUEST PROCESS AND COMMUNICATIONS DEVICE

(71) Applicant: VIVO MOBILE COMMUNICATION CO., LTD., Dongguan (CN)

(72) Inventor: Yumin Wu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 1015 days.

(21) Appl. No.: 17/225,129

(22) Filed: Apr. 8, 2021

(65) Prior Publication Data
US 2021/0226742 A1 Jul. 22, 2021

Related U.S. Application Data

(63) Continuation of application No. PCT/CN2019/105609, filed on Sep. 12, 2019.

(30) Foreign Application Priority Data

Oct. 10, 2018 (CN) .......................... 201811180379.3

(51) Int. Cl.
| | | |
|---|---|---|
| H04L 1/18 | (2023.01) | |
| H04L 1/1867 | (2023.01) | |
| H04L 5/00 | (2006.01) | |
| H04W 72/04 | (2023.01) | |
| H04W 72/0453 | (2023.01) | |

(Continued)

(52) U.S. Cl.
CPC .......... *H04L 1/1887* (2013.01); *H04L 5/0055* (2013.01); *H04L 5/0098* (2013.01); *H04W 72/0453* (2013.01); *H04W 72/20* (2023.01)

(58) Field of Classification Search
CPC ... H04L 1/1822; H04L 1/1825; H04L 1/1887; H04L 5/001; H04L 5/0055; H04L 5/0098; H04W 72/0453; H04W 72/20
See application file for complete search history.

(56) References Cited

U.S. PATENT DOCUMENTS

2018/0270799 A1 9/2018 Noh et al.

FOREIGN PATENT DOCUMENTS

| | | |
|---|---|---|
| CN | 105099634 A | 11/2015 |
| CN | 107493605 A | 12/2017 |
| CN | 108112080 A | 6/2018 |

(Continued)

OTHER PUBLICATIONS

Huawei et al. ("CR of Correct handling of DL assignment Semi persistent test case 7.1.1.6.1"; R5-184228; Aug. 24, 2018) (Year: 2018).*

(Continued)

*Primary Examiner* — Melvin C Marcelo
*Assistant Examiner* — Natali Pascual Peguero
(74) *Attorney, Agent, or Firm* — IPX PLLC (57) ABSTRACT

The present disclosure provides a data transmission method and a communications device. The method includes using a Hybrid Automatic Repeat Request (HARQ) process corresponding to a target Bandwidth Part (BWP) to transmit data on a semi-persistent scheduling resource in the target BWP. The HARQ processes respectively corresponding to N BWPs, including the target BWP, of a first cell are different, and N is an integer greater than 1.

12 Claims, 1 Drawing Sheet

Use a Hybrid Automatic Repeat Request (HARQ) process corresponding to a target Bandwidth Part (BWP) to transmit data on a semi-persistent scheduling resource in the target BWP, where HARQ processes respectively corresponding to N BWPs, comprising the target BWP, of a first cell respectively are different, and N is an integer greater than 1. — 201

(51) Int. Cl.
*H04W 72/12* (2023.01)
*H04W 72/20* (2023.01)

(56) References Cited

FOREIGN PATENT DOCUMENTS

| | | |
|---|---|---|
| CN | 108207032 A | 6/2018 |
| CN | 108513730 A | 9/2018 |
| CN | 108633070 A | 10/2018 |

OTHER PUBLICATIONS

LG Electronics et al. ("BWP selection based on HARQ process ID in NR-U"; R2-1812789; Aug. 24, 2018) (Year: 2018).*
International Search Report issued in corresponding International Application No. PCT/CN2019/103017, mailed Nov. 27, 2019, 4 pages.
LG Electronics Inc., "BWP selection based on HARQ process ID in NR-U", 3GPP TSG-RAN WG2 Meeting #103 R2-1812789 (Aug. 24, 2018).
Huawei, "CR of Correct handling of DL assignment Semi persistent test case 7.1.1.6.1", 3GPP TSG RAN WG5 #80 R5-184228, (Aug. 24, 2018).
LG Electronics Inc., "BWP selection based on HARQ process ID in NR-U", 3GPP TSG-RAN WG2 Ad hoc 1807 R2-1810597,(Jul. 6, 2018).
First Office Action issued in related Chinese application No. 201811180379.3, mailed Aug. 17, 2020, 8 pages.

\* cited by examiner

FIG. 1

Use a Hybrid Automatic Repeat Request (HARQ) process corresponding to a target Bandwidth Part (BWP) to transmit data on a semi-persistent scheduling resource in the target BWP, where HARQ processes respectively corresponding to N BWPs, comprising the target BWP, of a first cell respectively are different, and N is an integer greater than 1. — 201

DATA TRANSMISSION METHOD USING HYBRID AUTOMATIC REPEAT REQUEST PROCESS AND COMMUNICATIONS DEVICE

CROSS-REFERENCE OF RELATED APPLICATION

This application is a continuation of PCT Application No. PCT/CN2019/105609 filed on Sep. 12, 2019, which claims priority to Chinese Patent Application No. 201811180379.3 filed in China on Wednesday, Oct. 10, 2018, both of which are incorporated herein by reference in their entireties.

TECHNICAL FIELD

Some embodiments of the present disclosure relate to the field of communications technologies, and in particular, to a data transmission method and a communications device.

BACKGROUND

A network-side device may configure one or more Bandwidth Parts (BWPs) for a terminal. Further, the network-side device may configure a semi-persistent scheduling resource for the BWP, so that a communications device can use a Hybrid Automatic Repeat Request (HARQ) process to transmit data on the semi-persistent scheduling resource for the BWP.

Currently, only one BWP can be activated for the terminal in one cell. However, in a future communication system, multiple BWPs may be activated for the terminal in one cell. In this scenario, a same HARQ entity may be used for the multiple activated BWPs in one cell. Therefore, for multiple activated BWPs in a same cell, the problem to be resolved is how to allocate an HARQ process of an HARQ entity to a semi-persistent scheduling resource of each BWP.

SUMMARY

Some embodiments of the present disclosure provide a data transmission method and a communications device to provide a solution to the problem of allocating an HARQ process to a semi-persistent scheduling resource of each BWP among multiple activated BWPs in a same cell.

The present disclosure is implemented as follows:

According to a first aspect, some embodiments of the present disclosure provide a data transmission method that is applied to a communications device, where the method includes:

using a hybrid automatic repeat request HARQ process corresponding to a target BWP to transmit data on a semi-persistent scheduling resource in the target bandwidth part BWP, Where HARQ processes respectively corresponding to N BWPs, including the target BWP, of a first cell are different, and N is an integer greater than 1.

According to a second aspect, some embodiments of the present disclosure further provide a communications device, where the communications device includes:

a transmitting module, configured to use a hybrid automatic repeat request HARQ process corresponding to a target BWP to transmit data on a semi-persistent scheduling resource in the target bandwidth part BWP;

where HARQ processes respectively corresponding to N BWPs, including the target BWP, of a first cell are different, and N is an integer greater than 1.

According to a third aspect, some embodiments of the present disclosure further provide a communications device, where the communications device includes a processor, a memory and a computer program stored on the memory and executable on the processor, and when the computer program is executed by the processor, the step of the foregoing data transmission method is implemented.

According to a fourth aspect, some embodiments of the present disclosure further provides a computer-readable storage medium, where the computer-readable storage medium stores a computer program, and when the computer program is executed by a processor, the step of the foregoing data transmission method is implemented.

In some embodiments of the present disclosure, a communications device uses a hybrid automatic repeat request HARQ process corresponding to a target BWP to transmit data on a semi-persistent scheduling resource in the target bandwidth part BWP, where HARQ processes respectively corresponding to N BWPs, including the target BWP, of a first cell are different, and N is an integer greater than 1. It can be seen that the present disclosure may be used to allocate different HARQ processes to different BWPs of a first cell, which can regulate allocation of an HARQ process to a target BWP of the first cell on the one hand, and can avoid a conflict between HARQ processes on different BWPs on the other hand, thus improving a success rate of data transmission.

BRIEF DESCRIPTION OF DRAWINGS

To describe technical solutions of some embodiments of the present disclosure more clearly, the following briefly describes the accompanying drawings required for describing some embodiments of the present disclosure. Apparently, the accompanying drawings in the following description show merely some embodiments of the present disclosure, and a person of ordinary skill in the art may still derive other accompanying drawings from these accompanying drawings without creative efforts.

DETAILED DESCRIPTION

The following clearly and completely describes the technical solutions in some embodiments of the present disclosure with reference to the accompanying drawings in some embodiments of the present disclosure. Apparently, the described embodiments are merely some but not all of the embodiments of the present disclosure. All other embodiments obtained by a person of ordinary skill in the art based on the embodiments of this application without creative efforts shall fall within the protection scope of this application.

Terms "first" and "second" in this application are used to distinguish between similar objects, and do not need to be used to describe a specific order or sequence. In addition, terms "include", "have", and any modification thereof are intended to cover non-exclusive inclusion, for example, processes, methods, systems, products, or devices that contain a series of steps or units are not necessarily limited to those steps or units that are clearly listed, but may include other steps or units that are not clearly listed or are inherent to these processes, methods, products, or devices. In addition, in this application, "and/or" is used to indicate at least one of connected objects, for example, A and/or B and/or C indicates seven cases: only A, only B, only C, both A and B, both B and C, both A and C, and A, B and C.

Figure 1:
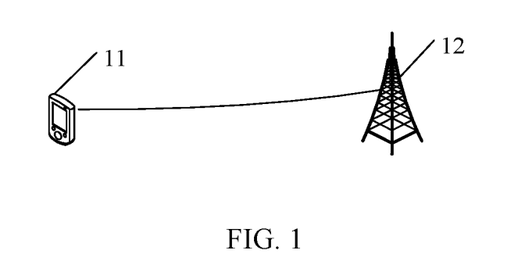
FIG. 1 is a structural diagram of a network system that may be applied to some embodiments of the present disclosure.

Refer to FIG. 1, which is a structural diagram of a network system that may be applied to some embodiments of the present disclosure. As shown in FIG. 1, the network system includes a communications device 11 and a network-side device 12, where the communications device 11 and the network-side device 12 can communicate with each other through a network.

In some embodiments of the present disclosure, the communications device 11 may also be referred to as User Equipment (UE). In a specific implementation, the communications device 11 may be a device at the communications device side such as a mobile phone, a Tablet Personal Computer, or a Laptop Computer, a Personal Digital Assistant (PDA), a Mobile Internet Device (MID), a Wearable Device, or a vehicle-mounted device. It should be noted that a specific type of the communications device 11 is not limited in some embodiments of the present disclosure.

The network-side device 12 may be a base station, a relay, an access point, or the like. The base station may be a base station of 5G and its later versions, such as a 5G NR NB, or a base station in another communication system, such as an evolved NodeB (eNB). It should be noted that a specific type of the network-side device 12 is not limited in some embodiments of the present disclosure.

For easy description, the following describes some content of some embodiments of the present disclosure:

I. Configuration of Semi-Persistent Scheduling Resource

A system (such as a 5G system) may configure UE with at least one of the following semi-persistent data transmission resources (or referred to as semi-persistent scheduling resources):

DownLink Semi-Persistent Scheduling (DL SPS);
UL Configured Grant Type 1;
UL Configured Grant Type 2; and
Autonomous Uplink (AUL).

The following describes different types of semi-persistent scheduling resources:

1. DL SPS

DL SPS is a periodic downlink resource configured by a network-side device, and one downlink resource is allocated in each period. further, the network-side device activates or deactivates the use of DL SPS through Physical Downlink Control Channel (PDCCH) control signaling (or referred to as a PDCCH command).

In a specific implementation, a position of an activated resource indicated by PDCCH control signaling (such as a start system frame number and a start time slot number) may be determined as a start position of the resource. A communications device, such as UE, may calculate a position of an $N^{th}$ resource through the following formula:

(quantity of time slots per system frame*current system frame number+time slot number of current system frame)=[(quantity of time slots per system frame*start system frame number+start time slot number)+$N$*periodicity*quantity of time slots per system frame/10]modulo (1024*quantity of time slots per system frame), where the modulo represents modular operation;

the quantity of time slots per system frame may be interpreted as: Number Of Slots Per Frame;

the current system frame number may be interpreted as: System Frame Number, SFN for short;

the time slot number of current system frame may be interpreted as: Slot Number In The Frame;

the start system frame number may be interpreted as: $SFN_{starttime}$;

the start time slot number may be interpreted as: $Slot_{starttime}$;

N may represent an $N^{th}$ resource; and the period may be interpreted as Periodicity, which may be an SPS resource period configured by a network-side device through an Radio Resource Control (RRC) (radio resource configuration) message.

An HARQ process ID of a time slot for DL SPS may be calculated through the following formula:

HARQ process ID=[Floor(current time slot number*10/(quantity of time slots per system frame*periodicity))]modulo(quantity of HARQ processes), where Floor( ) represents a Floor function, and its function is to "round down"; and the current time slot number may be interpreted as: Current_Slot, which may be calculated through the following formula in a specific implementation: current time slot number=[(current system frame number*quantity of time slots per system frame)+time slot number of current system frame.

The quantity of HARQ processes may be interpreted as: nrofHARQ-Processes, which may be a quantity of HARQ processes of an SPS resource configured by a network-side device through an RRC message in a specific implementation.

2. UL Configured Grant Type 1

UL configured grant Type 1 is a periodic uplink resource configured by a network-side device, and one uplink resource is allocated in each period. It is not required to activate UL configured grant Type 1 through PDCCH control signaling, which may be used in the case that RRC is configured.

In a specific implementation, a communications device, such as UE, may calculate a position of an $N^th$ resource through the following formula:

[(current system frame number*quantity of time slots per system frame*quantity of symbols per time slot)+(time slot number of current system frame*quantity of symbols per time slot)+symbol number of current time slot]=(time domain offset*quantity of symbols per time slot+$S$+$N$*periodicity)modulo(1024*quantity of time slots per system frame*quantity of symbols per time slot), where the quantity of symbols per time slot may be interpreted as: Number Of Symbols Per Slot, that is, the quantity of Orthogonal Frequency Division Multiplex (OFDM) symbols;

the time domain offset may be interpreted as Time Domain Offset, which may be understood as a resource offset relative to the time domain of SFN=0, for example, Slot 1; and N may represent an $N^{th}$ resource; S represents a number of a start symbol, for example, for a position of Slot 1, its start symbol is OFDM symbol 1.

An HARQ process ID of a time slot for UL configured grant Type 1 is calculated through the following formula:

HARQ process ID=[floor(current symbol number/period modulo(quantity of HARQ processes)), where the current symbol number may be interpreted as: Current_Symbol, which may be calculated through the following formula in a specific implementation: current symbol number=(current system frame number*quantity of time slots per system frame*quantity of symbols per time slot+time slot number of current system frame*quantity of symbols per time slot+symbol number of current time slot.

3. UL Configured Grant Type 2

UL configured grant Type 2 is a periodic uplink resource configured by a network-side device, and one uplink resource is allocated in each period. further, the network-side device activates or deactivates the use of an SPS resource through PDCCH control signaling.

In a specific implementation, a resource position indicated by the PDCCH control signaling for activation (such as a start system frame number, a start time slot number, and a start symbol number) may be determined as a start position of the resource. A communications device, such as UE, may calculate a position of an $N^{th}$ resource through the following formula:

[(current system frame number*quantity of time slots per system frame*quantity of symbols per time slot)+(time slot number of current system frame*quantity of symbols per time slot)+symbol number of current time slot]=[(start system frame number*quantity of time slots per system frame*quantity of symbols per time slot+start time slot number*quantity of symbols per time slot+start symbol number)+$N$*periodicity] modulo(1024*quantity of time slots per system frame*quantity of symbols per time slot), where the start symbol number may be interpreted as: $Symbol_{starttime}$.

A calculation formula for an HARQ process ID of a time slot for UL configured grant Type 2 may be the same as that for an HARQ process ID of time slot for UL configured grant Type 1, specifically as follows:

HARQ process ID=[floor(current symbol number/period)]modulo(quantity of HARQ processes)

4. AUL

AUL is a resource allocation of one bitmap (Bitmap) configured by a network-side device. For example, if one bit of 40 bits is set to 1, a resource corresponding to the bit set to 1 is allocated to UE. Further, the network-side device activates or deactivates the use of an AUL resource through PDCCH control signaling.

In a specific implementation, a position of an activated resource indicated through the PDCCH control signaling (such a start system frame number, a start time slot number, and a start symbol number) may be determined as a start position of the resource. When the UE has uplink data to send, it can autonomously select a HARQ process from a HARQ process pool configured by the network-side device.

2. Introduction to BWP

In a system, such as a 5G system, UE may only support a relatively small operating bandwidth (such as 5 MHz), and a cell of a network-side device will support a relatively large bandwidth (such as 100 MHz). The small bandwidth part where the UE operates in the large bandwidth is considered as a BWP.

From the perspective of UE configuration, different BWPs under one cell may be configured for implementing different UE functions. A same HARQ entity is used for multiple different BWPs.

The network-side device may configure the UE with one or more BWPs, and may switch a currently activated BWP for the UE through a BWP switching (Switching) command (such as PDCCH indication information), that is, activate a new BWP and deactivate the currently activated BWP. Currently, only one BWP can be activated for the UE in one cell.

In addition, the network-side device may configure a BWP-inactivity timer (BWP-Inactivity Timer) for one activated BWP. The UE starts up after one BWP is activated, and then changes the activated BWP to a default BWP (that is, default BWP) in the network configuration after the timer expires.

A data transmission method according to some embodiments of the present disclosure is described as follows.

Figure 2:
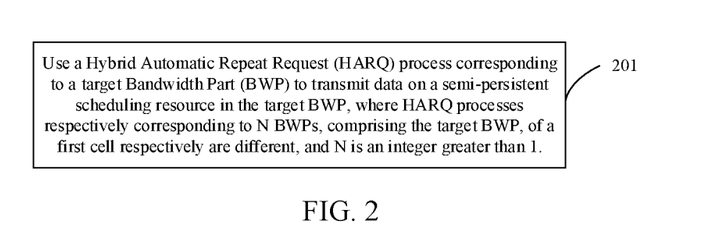
FIG. 2 is a flowchart of a data transmission method according to some embodiments of the present disclosure.

Refer to FIG. 2, which is a flowchart of a data transmission method according to some embodiments of the present disclosure. The data transmission method according to some embodiments of the present disclosure may be applied to a communications device. In a specific implementation, the communications device may be in the form of a terminal, that is, UE or a network-side device.

As shown in FIG. 2, the data transmission method according to this embodiment includes the following steps:

Step 201: use a hybrid automatic repeat request HARQ process corresponding to a target BWP to transmit data on a semi-persistent scheduling resource in the target bandwidth part BWP.

In some embodiments of the present disclosure, HARQ processes respectively corresponding to N BWPs, including the target BWP, of a first cell are different, and N is an integer greater than 1. That is, a different BWP of the first cell may transmit data through a different HARQ process, so that a conflict between HARQ processes on different BWPs can be avoided, thus improving a success rate of data transmission.

In addition, the semi-persistent scheduling resource in the target BWP may include at least one of the following: downlink semi-persistent scheduling (that is, DL SPS); uplink configured grant type 1 (that is, UL Configured Grant Type 1); uplink configured grant type 2 (that is, UL Configured Grant Type 2); and autonomous uplink (that is, AUL).

In a specific implementation, on the DL SPS of the target BWP, the network-side device may use the HARQ process corresponding to the target BWP to send data; and on the UL Configured Grant Type 1, UL Configured Grant Type 2 or AUL of the target BWP, the UE may use the HARQ process corresponding to the target BWP to send data.

It should be understood that, in some embodiments of the present disclosure, the target BWP may be any BWP of the N BWPs of the first cell, which may be specifically determined according to an actual need, which is not limited in some embodiments of the present disclosure.

In the data transmission method according to this embodiment, the communications device uses the hybrid automatic repeat request HARQ process corresponding to the target BWP to transmit data on the semi-persistent scheduling resource in the target bandwidth part BWP, where HARQ processes respectively corresponding to N BWPs, including the target BWP, of the first cell are different, and N is an integer greater than 1. It can be seen that a different HARQ process may be allocated to a different BWP of the first cell through the data transmission method according to this embodiment, which can regulate allocation of the HARQ process to the target BWP of the first cell on the one hand, and avoid a conflict between HARQ processes on different BWPs, thus increasing a success rate of data transmission on the other hand.

In some embodiments of the present disclosure, the communications device may obtain the HARQ process corresponding to the target BWP in advance.

Optionally, before the using a hybrid automatic repeat request HARQ process corresponding to a target BWP to transmit data on a semi-persistent scheduling resource in the target bandwidth part BWP, the method further includes:
  obtaining a number of the HARQ process (hereinafter referred to as HARQ process ID) corresponding to the target BWP according to configuration information of the semi-persistent scheduling resource,
  where the configuration information of the semi-persistent scheduling resource includes: a period of the semi-persistent scheduling resource in the target BWP; and/or, HARQ configuration information of the semi-persistent scheduling resource in the target BWP.

In this way, after obtaining the HARQ process ID corresponding to the target BWP, the communications device may transmit data on the HARQ process corresponding to the number.

In this embodiment, the configuration information of the semi-persistent scheduling resource may be determined by the network-side device. In a specific implementation, the network-side device may dispense the configuration information of the semi-persistent scheduling resource to UE, so that the UE can obtain, according to the configuration information of the semi-persistent scheduling resource, the HARQ process ID corresponding to the target BWP,
  where the configuration information of the semi-persistent scheduling resource may be used to configure the semi-persistent scheduling resource in the target BWP. Specifically, the period of the semi-persistent scheduling resource in the target BWP may be used to configure a period of the semi-persistent scheduling resource in the target BWP (such 40 milliseconds); the HARQ configuration information of the semi-persistent scheduling resource in the target BWP may be used to configure HARQ information of the semi-persistent scheduling resource in the target BWP.

In a specific implementation, the foregoing period and HARQ configuration information may be dispensed to the UE by the network-side device through the configuration information of the semi-persistent scheduling resource; or dispensed to the UE separately by the network-side device, and the period or the HARQ information may be carried in the configuration information of the semi-persistent scheduling resource, but it is not limited to this.

Further, the HARQ configuration information may include: a continuous or discrete HARQ process ID; and/or a quantity of HARQ processes available for a semi-persistent scheduling resource in each period.

In a specific implementation, the quantity of HARQ processes available for the semi-persistent scheduling resource in each period may be 1, or m, where m is an integer greater than 1.

In some implementation manners, content included in the HARQ configuration information may be determined based on the quantity of HARQ processes available for the semi-persistent scheduling resource in each period.

Exemplarily, if the quantity of HARQ processes available for the semi-persistent scheduling resource in each period is 1, that is, there is 1 HARQ process available for the semi-persistent scheduling resource in each period, the HARQ configuration information may not include the quantity of HARQ processes available for the semi-persistent scheduling resource in each period, and the communications device may default the quantity of HARQ processes available for the semi-persistent scheduling resource in each period to 1, thereby reducing signaling overhead.

If the quantity of HARQ processes available for the semi-persistent scheduling resource in each period is greater than 1, that is, there are multiple HARQ process available for the semi-persistent scheduling resource in each period, the HARQ configuration information may include a continuous or discrete HARQ process ID, and the quantity of HARQ processes available for the semi-persistent scheduling resource in each period.

For easy understanding, examples are as follows:

As the target BWP may be any BWP of the N BWPs of the first cell, it is understandable that, in a specific implementation, the HARQ configuration information may be used for:

Configuration Method 1

In the case that the quantity of HARQ processes available for the semi-persistent scheduling resource in each period is 1, the HARQ configuration information may be used for configuring one section of continuous HARQ process IDs (HARQ Process ID) for the semi-persistent scheduling resource of each BWP of the first cell. Exemplarily, a range of the HARQ process IDs of BWP1 is 0-3; a range of the HARQ process IDs of BWP2 is 4-7;

In the case that the quantity of HARQ processes available for the semi-persistent scheduling resource in each period is greater than 1, the HARQ configuration information may be used for configuring one section of continuous HARQ process IDs for the semi-persistent scheduling resource of each BWP of the first cell, and specifying the quantity of HARQ processes available for the semi-persistent scheduling resource in each period. Exemplarily, an HARQ Process ID range of BWP1 is 0-3, and a quantity of HARQ processes available for a semi-persistent scheduling resource in each period is 2; an HARQ Process ID range of BWP2 is 4-7, and a quantity of HARQ processes available for the semi-persistent scheduling resource in each period is 2.

Configuration Method 2

In the case that the quantity of HARQ processes available for the semi-persistent scheduling resource in each period is 1, the HARQ configuration information may be used for configuring a discrete HARQ process ID for the semi-persistent scheduling resource of each BWP of the first cell. Exemplarily, a range of the HARQ process IDs of BWP1 is [0, 2, 4, 6]; a range of the HARQ process IDs of BWP2 is [1, 3, 5, 7].

In the case that the quantity of HARQ processes available for the semi-persistent scheduling resource in each period is greater than 1, the HARQ configuration information may be used for configuring a discrete HARQ process ID for the semi-persistent scheduling resource of each BWP of the first cell, and specifying the quantity of the HARQ processes available for the semi-persistent scheduling resource in each period. Exemplarily, a range of the HARQ process IDs of BWP1 is [0, 2, 4, 6], the quantity of HARQ processes available for the semi-persistent scheduling resource in each period is 2; a range of the HARQ process IDs of BWP2 is [1, 3, 5, 7], the quantity of HARQ processes available for the semi-persistent scheduling resource in each period is 2.

It should be noted that the foregoing HARQ process ID is only an example, and it may be specifically determined according to an actual need, which is not limited in some embodiments of the present disclosure.

It is sure that in another implementation manner, the HARQ configuration information may not include the continuous or discrete HARQ process ID, and the continuous or discrete HARQ process ID for the semi-persistent scheduling resource in the target BWP may be predefined in a protocol, thereby reducing signaling overhead.

In this embodiment, a method for obtaining the HARQ process ID corresponding to the target BWP may be implemented through calculation according to the configuration information of the semi-persistent scheduling resource; or by extracting it from the configuration information of the semi-persistent scheduling resource, which may be specifically determined according to an actual situation, and which is not limited in some embodiments of the present disclosure.

Exemplarily, for the AUL of the target BWP, the UE may directly extract the HARQ process ID of the AUL of the target BWP from the configuration information of the semi-persistent scheduling resource. In a specific implementation, the UE may randomly select a corresponding unused HARQ process ID from the foregoing HARQ process IDs, and send uplink data through an HARQ process corresponding to the number.

Further, the semi-persistent scheduling resource include autonomous uplink, and the communications device is a terminal;

the using a hybrid automatic repeat request HARQ process of a target BWP to transmit data on a semi-persistent scheduling resource in the target bandwidth part BWP includes:
using the hybrid automatic repeat request HARQ process of the target BWP to transmit data on the semi-persistent scheduling resource in the target bandwidth part BWP, and sending information of the HARQ process of the target BWP to a network-side device.

In this scenario, the UE may randomly select a corresponding unused HARQ process ID from the configured HARQ process IDs, send uplink data through an HARQ process corresponding to the number, and notify the network-side device of information of the HARQ process,
where the information of the HARQ process may include an HARQ process ID, but is not limited to that.

With respect to the DL SPS, UL Configured Grant Type 1 or UL Configured Grant Type 2 of the target BWP, the communications device may calculate an HARQ process ID available for a semi-persistent scheduling resource in each period in the semi-persistent scheduling resource in the target BWP according to the configuration information of the semi-persistent scheduling resource.

It should be noted that, before calculating an HARQ process ID available for a semi-persistent scheduling resource in each period in the semi-persistent scheduling resource in the target BWP by the communications device may further include:

According to the configuration information of the semi-persistent scheduling resource, calculating a position of the semi-persistent scheduling resource in the target BWP (or what is called a position of the semi-persistent scheduling resource, hereinafter referred to as a resource position).

Further, in the case that the quantity of HARQ processes available for the semi-persistent scheduling resource in each period is greater than 1, the configuration information of the semi-persistent scheduling resource may further include:
resource allocation information of each period in the semi-persistent scheduling resource in the target BWP;

where the foregoing resource allocation information of each period may include at least one of the following:
a resource allocation bitmap; for example, positions of 10 time slots are identified by 10 bits; if a value of a certain bit is 1, a resource at a time slot position identified by the bit may be considered as the resource allocated to the UE;
a resource allocation duration; for example, for a resource with a period of 40 ms (millisecond), its resource allocation duration is 10 ms from a start position of the resource; and
a short resource allocation period; for example, for a resource with a period of 40 ms, there is a resource allocation duration of 10 ms for every 40 ms, and a resource allocation period within the 10 ms is 2 ms.

In this way, the communications device can calculate the position of the semi-persistent scheduling resource in the target BWP according to the foregoing resource allocation information of each period.

In a specific implementation, for DL SPS, UL Configured Grant Type 2 or AUL, the communications device may calculate a resource position of the target BWP according to the configuration information of the semi-persistent scheduling resource, an activated resource position indicated by activation signaling (such as a PDCCH activation command), and corresponding resource position calculation formulas thereof.

For UL Configured Grant Type 1, the communications device may calculate a resource position of the target BWP according to the configuration information of the semi-persistent scheduling resource and a resource position calculation formula corresponding to UL Configured Grant Type 1.

In this way, the communications device can calculate an HARQ process ID corresponding to each resource position of the target BWP by combining the configuration information of the semi-persistent scheduling resource and the calculated semi-persistent scheduling resource position of the target BWP.

In a practical application, for DL SPS, UL Configured Grant Type 1 or UL Configured Grant Type 2 of the target BWP, the communications device may calculate an HARQ process ID corresponding to each resource position of the target BWP through at least the following two calculation methods.

Calculation Method 1

Optionally, the obtaining an HARQ process ID corresponding to the target BWP according to configuration information of the semi-persistent scheduling resource includes:
calculating an HARQ process ID available for a semi-persistent scheduling resource in each period in the semi-persistent scheduling resource in the target BWP according to an initial HARQ process ID and a first offset;
where the initial HARQ process ID corresponds to the semi-persistent scheduling resource in the target BWP; and the first offset is determined according to continuous HARQ process IDs configured for the semi-persistent scheduling resource in the target BWP.

In a specific implementation, the initial HARQ process ID may be determined according to a target parameter of the semi-persistent scheduling resource in the target BWP (such as a type of the semi-persistent scheduling resource and a quantity of HARQ processes available for the semi-persistent scheduling resource in each period). It should be understood that the target parameter of the semi-persistent scheduling resource in the target BWP may be determined according to the configuration information of the semi-persistent scheduling resource.

The specific description is as follows.

In the case that the quantity of HARQ processes available for the semi-persistent scheduling resource in each period is 1, as only one HARQ process can be used in each period, the quantity of HARQ process IDs available for the semi-persistent scheduling resource in each period is also 1.

Therefore, in a specific implementation, a first calculation formula for the initial HARQ process ID corresponding to the semi-persistent scheduling resource in each period among the semi-persistent scheduling resources of the target BWP may be determined according to the foregoing target parameter. Further, add a first offset to the first calculation formula to generate a second calculation formula that can be used to calculate the HARQ process ID available for the semi-persistent scheduling resource in each period among the semi-persistent scheduling resources of the target BWP.

Example 1: if the type of the semi-persistent scheduling resource in the target BWP is DL SPS, the quantity of HARQ processes available for the semi-persistent scheduling resource in each period is 1, that is, there is one HARQ process available for the DL SPS of the target BWP in each period, and the foregoing first calculation formula may be expressed as:

the initial HARQ process ID corresponding to the semi-persistent scheduling resource in each period=[Floor(current time slot number*10/(quantity of time slots per system frame*periodicity))]modulo(quantity of HARQ processes).

The second calculation formula may be expressed as:

the HARQ process ID corresponding to the semi-persistent scheduling resource in each period= [Floor(current time slot number*10/(quantity of time slots per system frame*periodicity))] modulo(quantity of HARQ processes)+first offset Example 2: if the type of the semi-persistent scheduling resource in the target BWP is UL configured grant Type 1 or UL configured grant Type 2, the quantity of HARQ processes available for the semi-persistent scheduling resource in each period is 1, there is one HARQ process available for UL configured grant Type 1 or UL configured grant Type 2 of the target BWP, and the foregoing first calculation formula may be expressed as:

the initial HARQ process ID corresponding to the semi-persistent scheduling resource in each period=[floor (current symbol number/period)]modulo (quantity of HARQ processes)

The foregoing second calculation formula may be expressed as:

the HARQ process ID corresponding to the semi-persistent scheduling resource in each period= [floor(current symbol number/period)]modulo (quantity of HARQ processes)+first offset, where the first offset is determined according to continuous HARQ process IDs configured for the semi-persistent scheduling resource in the target BWP.

In a specific implementation, the first offset may be: a start value of the continuous HARQ process IDs configured for the semi-persistent scheduling resource in the target BWP. Exemplarily, if an HARQ Process ID range of BWP1 is 0-3, the first offset may be equal to 0; if an HARQ Process ID range of BWP2 is 4-7, the first offset may be equal to 4.

It is sure that the first offset may also be any HARQ process ID among the continuous HARQ process IDs configured for the semi-persistent scheduling resource in the target BWP. Exemplarily, if an HARQ Process ID range of BWP1 is 0-3, the first offset may be equal to 1, 2 or 3, which may be specifically determined according to an actual need, which is not limited in some embodiments of the present disclosure.

The first offset may also be a sum of an initial value and a preset value of the continuous HARQ process IDs configured for the semi-persistent scheduling resource in the target BWP, where the preset value may be determined according to an actual need, which is not limited in some embodiments of the present disclosure. Exemplarily, assuming that an HARQ Process ID range of BWP1 is 0-3 and the preset value is 1, the first offset may be equal to 1; or, assuming that an HARQ Process ID range of BWP1 is 0-3 and the preset value is −1, the first offset may be equal to −1.

In the case that the quantity of HARQ processes available for the semi-persistent scheduling resource in each period is m and m is an integer greater than 1, the quantity of HARQ process IDs available for the semi-persistent scheduling resource in each period is also m because m HARQ processes may be used in each period. It should be noted that there is a one-to-one correspondence between resource positions and HARQ process IDs, that is, one resource position corresponds to one HARQ process ID.

Therefore, optionally, the calculating an HARQ process ID available for a semi-persistent scheduling resource in each period in the semi-persistent scheduling resource in the target BWP according to an initial HARQ process ID and a first offset may be specifically expressed as:

calculating an HARQ process ID for a first one semi-persistent scheduling resource in each period among the semi-persistent scheduling resources of the target BWP according to the initial HARQ process ID and the first offset; and calculating an HARQ process ID for an $i^{th}$ semi-persistent scheduling resource in each period among the semi-persistent scheduling resources of the target BWP according to the HARQ process ID for the first one semi-persistent scheduling resource in each period, the HARQ configuration information, a period sequence, and a semi-persistent scheduling resource sequence;

where i is an integer greater than 1 and less than or equal to m.

In this scenario, the HARQ process ID for the $i^{th}$ semi-persistent scheduling resource in each period can be calculated based on the HARQ process ID for the first one semi-persistent scheduling resource (that is, the start resource) in each period, which is calculated first.

In a specific implementation, a third calculation formula, which may be used to calculate an initial HARQ process ID corresponding to a start resource position in each period, may be determined according to a target parameter of the semi-persistent scheduling resource in the target BWP. Further, add a first offset to the third calculation formula to generate a fourth calculation formula, which may be used to calculate an HARQ process ID available for the start resource position in each period.

Example 1: if a type of the semi-persistent scheduling resource in the target BWP is DL SPS, a quantity of HARQ processes available for the semi-persistent scheduling resource in each period is m, that is, there are m HARQ processes available for the DL SPS of the target BWP in each period, and the foregoing third calculation formula may be expressed as:

> the initial HARQ process ID corresponding to the first one semi-persistent scheduling resource in each period=[Floor(current time slot number*10/(quantity of time slots per system frame*periodicity))]modulo(quantity of HARQ processes/quantity of processes available for semi-persistent scheduling resource in each period).

The foregoing fourth calculation formula may be expressed as:

> the HARQ process ID corresponding to the first one semi-persistent scheduling resource in each period=the initial HARQ process ID corresponding to the first one semi-persistent scheduling resource in each period+first offset=[Floor (current time slot number*10/(quantity of time slots per system frame*periodicity))]modulo (quantity of HARQ processes/quantity of processes available for semi-persistent scheduling resource in each period)+first offset.

Example 2: if a type of the semi-persistent scheduling resource in the target BWP is UL configured grant Type 1 or UL configured grant Type 2, a quantity of HARQ processes available for the semi-persistent scheduling resource in each period is m, that is, there are m HARQ processes available for UL configured grant Type 1 or UL configured grant Type 2 of the target BWP in each period, the foregoing third calculation formula may be expressed as:

> the initial HARQ process ID corresponding to the first one semi-persistent scheduling resource in each period=[floor(current symbol number*10/(quantity of time slots per system frame*period))]modulo(quantity of HARQ processes/quantity of processes available for semi-persistent scheduling resource in each period)

The foregoing fourth calculation formula may be expressed as:

> the HARQ process ID corresponding to the first one semi-persistent scheduling resource in each period=the initial HARQ process ID corresponding to the first one semi-persistent scheduling resource in each period+first offset=[floor (current symbol number*10/(quantity of time slots per system frame*period))]modulo(quantity of HARQ processes/quantity of processes available for semi-persistent scheduling resource in each period)+first offset Afterward, an HARQ process ID for an $i^{th}$ semi-persistent scheduling resource in each period may be calculated based on the HARQ process ID for the first resource in each period. Specifically, the HARQ process ID for the $i^{th}$ semi-persistent scheduling resource in each period among the semi-persistent scheduling resources of the target BWP may be calculated according to the HARQ process ID for the first one semi-persistent scheduling resource in each period, the HARQ configuration information, a period sequence, and a semi-persistent scheduling resource sequence, where the period sequence and the semi-persistent scheduling resource sequence are used to determine a position of a semi-persistent scheduling resource. Specifically, the period sequence may be expressed as a $p^{th}$ period; the semi-persistent scheduling resource sequence may be expressed as a $q^{th}$ semi-persistent scheduling resource (hereinafter referred to as resource), where p and q are both positive integers, and their specific values may be determined according to an actual need, which is not limited in some embodiments of the present disclosure.

Exemplarily, assuming that a period=10; a quantity of HARQ processes=4; a quantity of processes available for a semi-persistent scheduling resource in each period (nrof-HARQ-ProcessesPer Period)=2. Further, 2 resource positions are configured for each period, and an HARQ Process ID range of BWP1 is 0-3.

If a calculated "HARQ process ID" for a first resource in a first period is 0, an "HARQ process ID" for a first resource in a second period is 2, an "HARQ process ID" for a first resource in a third period is 0, an "HARQ process ID" for a first resource in a fourth period is 2, and so on. Then, the remaining HARQ process IDs may be assigned to subsequent resources in each period according to a period sequence and a semi-persistent scheduling resource sequence. An "HARQ process ID" of a second resource in the first period is 1; an "HARQ process ID" of a second resource in the second period is 3; an "HARQ process ID" of a second resource in the third period is 1; an "HARQ process ID" of a second resource in the fourth period is 3, and so on.

In a practical application, a communications device may substitute the first offset and the information of the semi-persistent scheduling resource (such as a resource position and a period) of the target BWP in calculation method 1 into the second calculation formula to calculate the HARQ process ID available for the first one semi-persistent scheduling resource in each period in the semi-persistent scheduling resource in the target BWP.

Further, if the quantity of HARQ process IDs available for the semi-persistent scheduling resource in each period is greater than 1, an HARQ process ID available for an $i^{th}$ semi-persistent scheduling resource in each period may be calculated based on an HARQ process ID available for a first one semi-persistent scheduling resource in each period.

In addition, as the first offset is determined according to the continuous HARQ process IDs, it can be seen that calculation method 1 may be applied to the foregoing configuration method 1.

Calculation Method 2

Optionally, the obtaining an HARQ process ID corresponding to the target BWP according to configuration information of the semi-persistent scheduling resource includes:

calculating a semi-persistent scheduling resource in the target BWP corresponding to a first HARQ process ID according to an initial HARQ process ID and a second offset; and calculating an HARQ process ID available for a semi-persistent scheduling resource in each period in the semi-persistent scheduling resource in the target BWP according to the semi-persistent scheduling resource in the target BWP corresponding to the first HARQ process ID, the HARQ configuration information, a period sequence, and a semi-persistent scheduling resource sequence;

where the initial HARQ process ID corresponds to the semi-persistent scheduling resource in the target BWP; the second offset is determined according to HARQ process IDs configured for the semi-persistent scheduling resource in the target BWP. In addition, it should be understood that the first HARQ process ID is: a start value of the HARQ process ID configured for the semi-persistent scheduling resource in the target BWP.

It should be noted that in calculation method 2, in the case that the quantity of HARQ processes available for the semi-persistent scheduling resource in each period is 1 or greater than 1, the semi-persistent scheduling resource in the target BWP corresponding to the first HARQ process ID may be calculated based on the second calculation formula in calculation method 1. However, it should be noted that when the semi-persistent scheduling resource in the target BWP corresponding to the first HARQ process ID is calculated, the first offset in calculation method 2 needs to be replaced with the second offset, where a difference between the first offset and the second offset is that the first offset is determined according to continuous HARQ process IDs, and the second offset may be determined according to continuous or discrete HARQ process IDs. It should be noted that a principle of a method for determining the second offset is the same as that of a method for determining the first offset. For details, reference may be made to the description of the method for determining the first offset, which is not limited in some embodiments of the present disclosure.

Calculation method 2 is different from calculation method 1 in that a communications device may first calculate a position of a semi-persistent scheduling resource in the target BWP corresponding to a first HARQ process ID, and then based on this, calculate an HARQ process ID corresponding to a semi-persistent scheduling resource position in each period in the semi-persistent scheduling resource in the target BWP.

In calculation method 2, the communications device may substitute the first HARQ process ID into the second calculation formula or the fourth calculation formula to calculate the position of the semi-persistent scheduling resource in the target BWP corresponding to the first HARQ process ID.

Afterward, starting from this resource position, HARQ process IDs corresponding to subsequent resources on the BWP increase in sequence based on the HARQ process ID corresponding to this resource position, where positions of the subsequent resources on the BWP are calculated first.

Exemplarily, assume that an HARQ Process ID range of BWP1 is [0, 2, 4, 6], and a semi-persistent scheduling resource period is 10 ms.

Scenario 1: There is one resource (that is, semi-persistent scheduling resource) in one period, which is: Slot=1.

In this scenario, if a resource position of an HARQ process ID=0 of BWP1 calculated by the communications device is (SFN=1, Slot=1), that is, a first resource for a first period, a second resource for a second period, that is, an HARQ process ID of a position (SFN=2, Slot=1) is 2, a second resource for a third period, that is, an HARQ process ID of a position (SFN=3, Slot=1) is 4, a second resource for a fourth period, that is, an HARQ process ID of a position (SFN=4, Slot=1) is 6, a second resource for a fifth period, that is, an HARQ process ID of a position (SFN=5, Slot=1) is 0, and so on.

Scenario 2: There are two resources in one period, namely Slot=1 and Slot=2.

In this scenario, if a resource position of an HARQ process ID=0 of BWP1 calculated by the communications device is (SFN=1, Slot=1), that is, a first resource for a first period, a second resource of the first period, that is, an HARQ process ID of a position (SFN=1, Slot=2) is 2, a first resource for a second period, that is, an HARQ process ID of a position (SFN=2, Slot=1) is 4, a second resource for the second period, that is, an HARQ process ID of a position (SFN=2, Slot=2) is 6, a first resource for a third period, that is, an HARQ process ID of a position (SFN=3, Slot=1) is 0, and so on.

In addition, as the second offset may be a start value of continuous or discrete HARQ process IDs, calculation method 2 may be applicable to the foregoing configuration method 1 and configuration method 2.

It should be noted that multiple optional implementation manners introduced in some embodiments of the present disclosure may be implemented in combination with each other or implemented separately, which is not limited in some embodiments of the present disclosure.

For easy understanding, specific embodiments are described as follows:

Embodiment 1: There is one HARQ process available for DL SPS in each period.

Step 1: a network-side device dispenses configuration information of multiple DL SPS resources to multiple BWPs of a same cell of UE, where the "resource configuration information" includes:

a resource period (such as 40 ms); and
HARQ configuration information of DL SPS on each BWP,
where the "HARQ configuration information of DL SPS on the BWP" includes any one of the following:
configuration method 1: a semi-persistent scheduling resource of each BWP is allocated with one section of continuous HARQ Process IDs (for example, an HARQ Process ID range of BWP1 is 0-3; an HARQ Process ID range of BWP2 is 4-7); and
configuration method 2: each BWP may be allocated with a discrete HARQ Process ID. (For example, an HARQ Process ID range of BWP1 is [0, 2, 4, 6]; an HARQ Process ID range of BWP2 is [1, 3,5,7])

Step 2.1: When the network-side device sends activation signaling (such as a PDCCH activation command), the UE calculates position information of a resource available for it according to the configuration information in step 1 and resource position information provided by the activation signaling, and uses the resource at that position.

Step 2.2: The UE calculates an HARQ process ID available for a semi-persistent scheduling resource in each period according to the configuration information in step 1 (the quantity of HARQ processes available for the semi-persistent scheduling resource in each period is 1 in this embodiment).

Calculation method 1: add an offset to the HARQ process ID calculation formula, where a value of the offset is a start value of an HARQ Process ID range. For example, if an HARQ Process ID range of BWP1 is 0-3; an HARQ Process ID range of BWP2 is 4-7, an offset of BWP1 is 0, and an offset of BWP2 is 4. This calculation method is applicable to configuration method 1.

For example:

HARQ Process ID=[floor(Current_Slot*10/(number Of Slots Per Frame*Periodicity))]modulo(nrof-HARQ-Processes)+Offset Calculation method 2: UE calculates a position of a start HARQ Process ID according to a quantity of HARQ processes and an offset, where the offset is the same as that in method 1, and starting from this position, HARQ process IDs in subsequent periods increase in sequence. For example, if a resource position with HARQ process ID=0 of BWP1 is (SFN=1, Slot=1) and a semi-persistent resource period is 10 ms, an HARQ process ID at the position (SFN=2, Slot=1) is 2, an HARQ process ID at the position (SFN=3, Slot=1) is 4, an HARQ process ID at the position (SFN=4, Slot=1) is 6, and an HARQ process ID at the position (SFN=5, Slot=1) is 0. The calculation method is applicable to both configuration method 1 and configuration method 2.

For example:

HARQ Process ID=[floor(Current_Slot*10/(number Of Slots Per Frame*Periodicity))]modulo(nrof-HARQ-Processes)+Offset Step 2.3: the network-side device uses a corresponding HARQ process to send data at a corresponding resource position.

Embodiment 2: There are multiple HARQ processes available for DL SPS in each period.

Step 1: A network-side device dispenses configuration information of multiple DL SPS resources to multiple BWPs of a same cell of UE, where the "resource configuration information" includes:

a resource period (such as 40 ms); and
resource allocation information of the resource in each period; and
HARQ configuration information of DL SPS on each BWP, where the "HARQ configuration information of DL SPS on the BWP" includes any one of the following:

Configuration method 1: a semi-persistent scheduling resource of each BWP is allocated with a section of continuous HARQ Process IDs, and in addition, a quantity of HARQ processes available for a semi-persistent scheduling resource in each period is specified. For example, an HARQ Process ID range of BWP1 is 0-3, and a quantity of HARQ processes available for a semi-persistent scheduling resource in each period is 2; an HARQ Process ID range of BWP2 is 4-7, and a quantity of HARQ processes available for a semi-persistent scheduling resource in each period is 2.

Configuration method 2: each BWP may be allocated with a discrete HARQ Process ID, and in addition, a quantity of HARQ processes available for a semi-persistent scheduling resource in each period is specified. For example, an HARQ Process ID range of BWP1 is [0, 2, 4, 6], and a quantity of HARQ processes available for a semi-persistent scheduling resource in each period is 2; an HARQ Process ID range of BWP2 is [1, 3, 5, 7], and a quantity of HARQ processes available for a semi-persistent scheduling resource in each period is 2.

Step 2.1: the same as step 2.1 in Embodiment 1.

When the network side-device sends activation signaling (such as a PDCCH activation command), the UE calculates position information of a resource available for it according to the configuration information in step 1 and resource position information provided by the activation signaling, and uses the resource at that position.

Step 2.2: the UE calculates an HARQ process ID available for a semi-persistent scheduling resource in each period according to the configuration information in step 1 (the quantity of HARQ processes available for the semi-persistent scheduling resource in each period is multiple HARQ processes in this embodiment).

Calculation method 1: add an offset to the HARQ process ID calculation formula, where a value of the offset is a start value of an HARQ Process ID range. (For example, if an HARQ Process ID range of BWP1 is 0-3; an HARQ Process ID range of BWP2 is 4-7, an offset of BWP1 is 0, and an offset of BWP2 is 4.). This calculation method is applicable to configuration method 1.

For example:

An HARQ Process ID for a start resource of the UE in each period is:

HARQ Process ID=[floor(Current_Slot*10/(number Of Slots Per Frame*Periodicity))]modulo(nrof-HARQ-Processes/nrofHARQ-Processes Per Period)+Offset HARQ Process IDs for subsequent resources of the UE in each period are as follows:

The remaining HARQ Process IDs are allocated in sequence according to a period sequence and a resource sequence.

For example: Periodicity=10; nrofHARQ-Processes=4; "nrofHARQ-Processes Per Period=2. If the network-side device is configured with two resource positions in each period, an "HARQ Process ID of a first resource in a first period is 0"; an "HARQ Process ID of a first resource in a second period is 2"; an "HARQ Process ID of a first resource in a third period is 0"; an "HARQ Process ID of a first resource in a fourth period is 2", and so on; and an "HARQ Process ID of a second resource in the first period is 1"; an "HARQ Process ID of a second resource in the second period is 3"; an "HARQ Process ID of a second resource in the third period is 1"; an "HARQ Process ID of a second resource in the fourth period is 3", and so on.

Calculation method 2: The UE calculates a position of a start HARQ Process ID according to a quantity of HARQ processes and an offset, where the offset is the same as that in method 1, and starting from this position, HARQ process IDs in subsequent periods increase in sequence. If a resource position with HARQ Process ID=0 of BWP1 calculated by the UE is (SFN=1, Slot=1), there are two resources in one period, which are (Slot=1 and Slot=2) respectively, and a semi-persistent resource period is 10 ms, an HARQ Process ID at the position (SFN=1, Slot=2) is 2, an HARQ Process ID at the position (SFN=2, Slot=1) is 4, an HARQ Process ID at the position (SFN=2, Slot=2) is 6, and an HARQ Process ID at a position (SFN=3, Slot=1) is 0. The calculation method is applicable to both configuration method 1 and configuration method 2.

Step 2.3: the same as step 2.3 in Embodiment 1.

Embodiment 3: there is one HARQ process available for UL configured grant Type 1 in each period.

Step 1: a network-side device dispenses configuration information of multiple UL configured grant Type 1 resources to multiple BWPs of a same cell of UE, where the "resource configuration information" includes:

a resource period (such as 40 ms);
HARQ configuration information of UL configured grant Type 1 on each BWP (same as Embodiment 1);

Step 2.1: the UE calculates position information of a resource available for it according to the configuration information in step 1, and uses the resource at that position.

Step 2.2: the UE calculates an HARQ process ID available for a semi-persistent scheduling resource in each period according to the configuration information in step 1 (the quantity of HARQ processes available for the semi-persistent scheduling resource in each period is 1 in this embodiment).

Calculation method 1: reference may be made to Embodiment 1 for the principle, which will no longer be repeated here.

For example:

HARQ Process ID=[Floor(Current_Symbol/Periodicity)]modulo (nrofHARQ-Processes)+Offset Calculation method 2: reference may be made to Embodiment 1 for the principle, which will no longer be repeated here.

For example:

HARQ Process ID=[Floor(Current_Symbol/Periodicity)]modulo (nrofHARQ-Processes)+Offset Step 2.3: the UE uses a corresponding HARQ process to send data at the resource position in each period.

Embodiment 4: There are multiple HARQ processes available for UL configured grant Type 1 in each period.

Step 1: a network-side device dispenses configuration information of multiple UL configured grant Type 1 resources to multiple BWPs of a same cell of UE, where the "resource configuration information" includes any combination of one or more of the following:

a resource period (such as 40 ms);
resource allocation information of the resource in each period; and
HARQ configuration information of UL configured grant Type 1 on each BWP (same as Embodiment 2).

Step 2.1: the same as step 2.1 in Embodiment 3.

Step 2.2: the UE calculates an HARQ process ID available for a semi-persistent scheduling resource in each period according to the configuration information in step 1 (the quantity of HARQ processes available for the semi-persistent scheduling resource in each period is multiple HARQ processes in this embodiment).

Calculation method 1: reference may be made to Embodiment 2 for the principle, which will no longer be repeated here.

For example:

An HARQ Process ID for a start resource of the UE in each period is:

HARQ Process ID=[Floor(Current_Symbol/Periodicity)]modulo (nrofHARQ-Processes/nrofHARQ-Processes Per Period)+Offset The remaining HARQ Process IDs are allocated in sequence according to a period sequence and a resource sequence.

For example: Periodicity=10; nrofHARQ-Processes=4; nrofHARQ-Processes Per Period=2. If the network-side device is configured with two resource positions in each period, an "HARQ Process ID of a first resource in a first period is 0"; an "HARQ Process ID of a first resource in a second period is 2"; an "HARQ Process ID of a first resource in a third period is 0"; an "HARQ Process ID of a first resource in a fourth period is 2", and so on; and an "HARQ Process ID of a second resource in the first period is 1"; an "HARQ Process ID of a second resource in the second period is 3"; an "HARQ Process ID of a second resource in the third period is 1"; an "HARQ Process ID of a second resource in the fourth period is 3", and so on.

Calculation method 2: reference may be made to Embodiment 2 for the principle, which will no longer be repeated here.

Step 2.3: the same as step 2.3 in Embodiment 3.

Embodiment 5: there is one HARQ process available for UL configured grant Type 2 in each period.

Step 1: a network-side device dispenses configuration information of multiple UL configured grant Type 2 resources to multiple BWPs of a same cell of UE, where the "resource configuration information" includes any combination of one or more of the following:

a resource period (such as 40 ms);
HARQ configuration information of UL configured grant Type 2 on each BWP (same as Embodiment 1).

Step 2.1: when the network-side device sends activation signaling (such as a PDCCH activation command), the UE calculates position information of a resource available for it according to the configuration information in step 1 and resource position information provided by the activation signaling, and uses the resource at that position.

Step 2.2: the UE calculates an HARQ process ID available for a semi-persistent scheduling resource in each period according to the configuration information in step 1 (the quantity of HARQ processes available for the semi-persistent scheduling resource in each period is 1 in this embodiment).

Calculation method 1: reference may be made to Embodiment 1 for the principle, which will no longer be repeated here.

For example:

HARQ Process ID=[Floor(Current_Symbol/Periodicity)]modulo (nrofHARQ-Processes)+Offset Calculation method 2: reference may be made to Embodiment 1 for the principle, which will no longer be repeated here.

HARQ Process ID=[Floor(Current_Symbol/Periodicity)]modulo (nrofHARQ-Processes)+Offset Step 2.3: the UE uses a corresponding HARQ process to send data at the resource position in each period.

Embodiment 6: There are multiple HARQ processes available for UL configured grant Type 2 in each period.

Step 1: a network-side device dispenses configuration information of multiple UL configured grant Type 2 resources to multiple BWPs of a same cell of UE, where the "resource configuration information" includes any combination of one or more of the following:

a resource period (such as 40 ms);
resource allocation information of the resource in each period; and
HARQ configuration information of UL configured grant Type 2 on each BWP (same as Embodiment 1).

Step 2.1: when the network-side device sends activation signaling (such as a PDCCH activation command), the UE calculates position information of a resource available for it according to the configuration information in step 1 and resource position information provided by the activation signaling, and uses the resource at that position.

Step 2.2: the UE calculates an HARQ process ID available for a semi-persistent scheduling resource in each period according to the configuration information in step 1 (the quantity of HARQ processes available for the semi-persistent scheduling resource in each period is 1 in this embodiment).

Calculation method 1: reference may be made to Embodiment 2 for the principle, which will no longer be repeated here.

For example:

An HARQ Process ID for a start resource of the UE in each period is:

HARQ Process ID=[Floor(Current_Symbol/Periodicity)]modulo (nrofHARQ-Processes)+Offset The remaining HARQ Process IDs are allocated in sequence according to a period sequence and a resource sequence.

For example: Periodicity=10; nrofHARQ-Processes=4; nrofHARQ-Processes Per Period=2. If the network-side device is configured with two resource positions in each period, an "HARQ Process ID of a first resource in a first period is 0"; an "HARQ Process ID of a first resource in a second period is 2"; an "HARQ Process ID of a first resource in a third period is 0"; an "HARQ Process ID of a first resource in a fourth period is 2", and so on; and an "HARQ Process ID of a second resource in the first period is 1"; an "HARQ Process ID of a second resource in the second period is 3"; an "HARQ Process ID of a second resource in the third period is 1"; an "HARQ Process ID of a second resource in the fourth period is 3", and so on.

Calculation method 2: reference may be made to Embodiment 2 for the principle, which will no longer be repeated here.

Step 2.3: the same as step 2.3 in Embodiment 5.

Embodiment 7: AUL configures UE to select an HARQ process.

Step 1: a network-side device dispenses configuration information of multiple AUL resources to multiple BWPs of a same cell of UE, where the "resource configuration information" includes any combination of one or more of the following:

a resource period (such as 40 ms);
resource allocation information in each period; and
HARQ configuration information of AUL on each BWP (same as Embodiment 1),
where the resource allocation information in each period includes any combination of one or more of the following:
a resource allocation bitmap (for example, positions of 10 Slots are identified by 10 bits, and a bit with a value of 1 considers that resources at the positions of the Slots are resources allocated to UE);
a resource allocation duration (for example, for a resource with a period of 40 ms, the resource allocation duration is 10 ms from the beginning of the resource); and
a short resource allocation period (for example, for a resource with a period of 40 ms, there is a resource allocation duration of 10 ms for every 40 ms, and the resource allocation period within the 10 ms is 2 ms).

It should be understood that the "resource allocation information in each period" in the foregoing embodiment may contain the same content as the "resource allocation information in each period" in this embodiment.

Step 2.1: when the network-side device sends activation signaling (such as PDCCH activation command), the UE calculates position information of a resource available for it according to the configuration information in step 1 and resource position information provided by the activation signaling, and uses the resource at that position.

Step 2.2: According to the HARQ configuration information in step 1, when the UE needs to send uplink data on a corresponding AUL resource of a corresponding BWP, it randomly selects an unused HARQ process from configured HARQ Process IDs to send the uplink data, and notify the network-side device of information of the HARQ process used.

Figure 3:
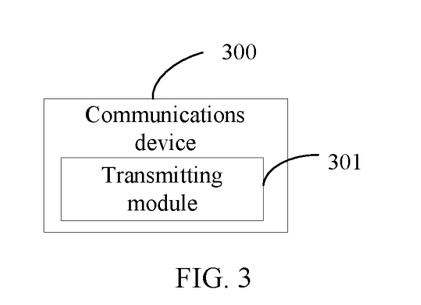
FIG. 3 is a structural diagram 1 of a communications device according to some embodiments of the present disclosure.

Refer to FIG. 3, which is a structural diagram 1 of a communications device according to some embodiments of the present disclosure. As shown in FIG. 3, a communications device 300 includes:

a transmitting module 301, configured to use a hybrid automatic repeat request HARQ process corresponding to a target BWP to transmit data on a semi-persistent scheduling resource in the target bandwidth part BWP, where HARQ processes respectively corresponding to N BWPs, including the target BWP, of a first cell are different, and N is an integer greater than 1.

The following will describe modules further included in the communications device 300 and elements included in each module on the basis of FIG. 3.

Optionally, the communications device 300 further includes:

an obtaining module, configured to obtain a HARQ Process ID corresponding to the target BWP according to configuration information of the semi-persistent scheduling resource before using the hybrid automatic repeat request HARQ process corresponding to the target BWP to transmit the data on the semi-persistent scheduling resource in the target bandwidth part BWP,
where the configuration information of the semi-persistent scheduling resource includes: a period of the semi-persistent scheduling resource in the target BWP, and HARQ configuration information of the semi-persistent scheduling resource in the target BWP.

Optionally, the HARQ configuration information includes: a continuous or discrete HARQ process ID; and/or a quantity of HARQ processes available for a semi-persistent scheduling resource in each period.

Optionally, the obtaining module is specifically configured to:

calculate an HARQ process ID available for a semi-persistent scheduling resource in each period in the semi-persistent scheduling resource in the target BWP according to an initial HARQ process ID and a first offset;
where the initial HARQ process ID corresponds to the semi-persistent scheduling resource in the target BWP; and the first offset is determined according to continuous HARQ process IDs configured for the semi-persistent scheduling resource in the target BWP.

Optionally, the quantity of HARQ processes available for the semi-persistent scheduling resource in each period is m, and m is an integer greater than 1;
the obtaining module includes:
a first calculating unit, configured to calculate an HARQ process ID available for a semi-persistent scheduling resource in each period in the semi-persistent scheduling resource in the target BWP according to an initial HARQ process ID and a first offset; and
a second calculating unit, configured to calculate an HARQ process ID for an $i^{th}$ semi-persistent scheduling resource in each period among the semi-persistent scheduling resources of the target BWP according to an HARQ process ID for a first one semi-persistent scheduling resource in each period, the HARQ configuration information, a period sequence, and a semi-persistent scheduling resource sequence,
where i is an integer greater than 1 and less than or equal to m.

Optionally, the obtaining module includes:
a third calculating unit, configured to calculate a semi-persistent scheduling resource in the target BWP corresponding to a first HARQ process ID according to an initial HARQ process ID and a second offset; and a fourth calculating unit, configured to calculate an HARQ process ID available for a semi-persistent scheduling resource in each period in the semi-persistent scheduling resource in the target BWP according to the semi-persistent scheduling resource in the target BWP corresponding to the first HARQ process ID, the HARQ configuration information, an period sequence, and a semi-persistent scheduling resource sequence;

where the initial HARQ process ID corresponds to the semi-persistent scheduling resource in the target BWP; the second offset is determined according to HARQ process IDs configured for the semi-persistent scheduling resource in the target BWP.

Optionally, the semi-persistent scheduling resource includes at least one of the following: downlink semi-persistent scheduling; uplink configured grant type 1; uplink configured grant type 2; autonomous uplink.

Optionally, the semi-persistent scheduling resource includes autonomous uplink, and the communications device is a terminal;

The transmitting module 301 is specifically configured to:
use the hybrid automatic repeat request HARQ process of the target BWP to transmit data on the semi-persistent scheduling resource in the target bandwidth part BWP, and send information of the HARQ process of the target BWP to a network-side device.

The communications device 300 can implement all processes in the method embodiments of the present disclosure, and achieve same beneficial effects. To avoid repetition, details are not described herein again.

Figure 4:
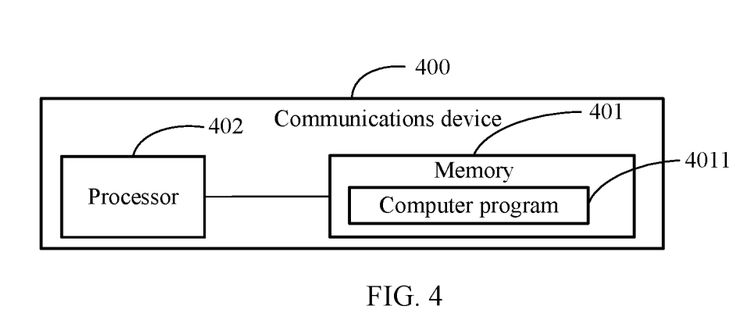
FIG. 4 is a structural diagram 2 of a communications device according to some embodiments of the present disclosure.

Refer to FIG. 4, which is a structural diagram 2 of a communications device according to some embodiments of the present disclosure. As shown in FIG. 4, a communications device 400 includes a memory 401, a processor 402, and a computer program 4011 that is stored in the memory 401 and that can run on the processor 402.

The following step is implemented when the computer program 4011 is executed by the processor 402:

using a hybrid automatic repeat request HARQ process corresponding to a target BWP to transmit data on a semi-persistent scheduling resource in the target bandwidth part BWP;

where HARQ processes respectively corresponding to N BWPs, including the target BWP, of a first cell are different, and N is an integer greater than 1.

Optionally, the following step may further be implemented when the computer program 4011 is executed by the processor 402: obtaining an HARQ process ID corresponding to the target BWP according to configuration information of the semi-persistent scheduling resource, where the configuration information of the semi-persistent scheduling resource includes: a period of the semi-persistent scheduling resource in the target BWP, and HARQ configuration information of the semi-persistent scheduling resource in the target BWP.

Optionally, the HARQ configuration information includes: a continuous or discrete HARQ process ID; and/or a quantity of HARQ processes available for a semi-persistent scheduling resource in each period.

Optionally, when the computer program 4011 is executed by the processor 402, the following step may be further performed:

calculating an HARQ process ID available for a semi-persistent scheduling resource in each period in the semi-persistent scheduling resource in the target BWP according to an initial HARQ process ID and a first offset, where the initial HARQ process ID corresponds to the semi-persistent scheduling resource in the target BWP; and the first offset is determined according to continuous HARQ process IDs configured for the semi-persistent scheduling resource in the target BWP.

Optionally, the quantity of HARQ processes available for the semi-persistent scheduling resource in each period is m, and m is an integer greater than 1;

When the computer program 4011 is executed by the processor 402, the following steps may be further performed:

calculating an HARQ process ID for a first one semi-persistent scheduling resource in each period among the semi-persistent scheduling resources of the target BWP according to the initial HARQ process ID and the first offset; and calculating an HARQ process ID for an $i^{th}$ semi-persistent scheduling resource in each period among the semi-persistent scheduling resources of the target BWP according to an HARQ process ID for a first one semi-persistent scheduling resource in each period, the HARQ configuration information, a period sequence, and a semi-persistent scheduling resource sequence, where i is an integer greater than 1 and less than or equal to m.

Optionally, when the computer program 4011 is executed by the processor 402, the following steps may be further performed:

calculating a semi-persistent scheduling resource in the target BWP corresponding to a first HARQ process ID according to an initial HARQ process ID and a second offset; and calculating an HARQ process ID available for a semi-persistent scheduling resource in each period in the semi-persistent scheduling resource in the target BWP according to the semi-persistent scheduling resource in the target BWP corresponding to the first HARQ process ID, the HARQ configuration information, an period sequence, and a semi-persistent scheduling resource sequence;

where the initial HARQ process ID corresponds to the semi-persistent scheduling resource in the target BWP; the second offset is determined according to HARQ process IDs configured for the semi-persistent scheduling resource in the target BWP.

Optionally, the semi-persistent scheduling resource includes at least one of the following: downlink semi-persistent; uplink configured grant type 1; uplink configured grant type 2; autonomous uplink.

Optionally, the semi-persistent scheduling resource includes autonomous uplink, and the communications device is a terminal;

Optionally, when the computer program 4011 is executed by the processor 402, the following steps may be further performed:

use the hybrid automatic repeat request HARQ process of the target BWP to transmit data on the semi-persistent scheduling resource in the target bandwidth part BWP, and send information of the HARQ process of the target BWP to a network-side device.

The communications device 400 can implement processes implemented by the communications device in the foregoing method embodiments. To avoid repetition, details are not described herein again.

Some embodiments of the present disclosure further provide a computer-readable storage medium, where the computer-readable storage medium stores a computer program. When the computer program is executed by a processor, the processes of the foregoing embodiments of the data transmission method are implemented, and can achieve the same technical effects. To avoid repetition, details are not described herein again. The computer-readable storage medium is, for example, a Read-Only Memory (ROM), a Random Access Memory (RAM), a magnetic disk, or an optical disc.

It should be noted that, in this specification, the terms "include", "comprise", or any of their variants are intended to cover a non-exclusive inclusion, such that a process, a method, an article, or an apparatus that includes a list of elements not only includes those elements, but also includes other elements that are not expressly listed, or further includes elements inherent to such a process, method, article, or apparatus. In the absence of more restrictions, an element defined by the statement "including a . . . " does not exclude another same element in a process, method, article, or apparatus that includes the element.

By means of the foregoing description of the embodiments, a person skilled in the art may clearly understand that the method in the foregoing embodiments may be implemented by software with a necessary general hardware platform. Certainly, the method in the foregoing embodiments may also be implemented by hardware. However, in many cases, the former is a preferred implementation. Based on such an understanding, the technical solutions of the present disclosure essentially or the part contributing to related technologies may be implemented in a form of a software product. The computer software product is stored in a storage medium (such as a ROM/RAM, a magnetic disk, or an optical disc) and includes several instructions for instructing a communications device (which may be a mobile phone, a computer, a server, an air conditioner, or a network device) to execute the methods described in the embodiments of the present disclosure.

The embodiments of the present disclosure are described above with reference to the accompanying drawings, but the present disclosure is not limited to the foregoing specific implementations. The foregoing specific implementations are merely exemplary instead of restrictive. Under enlightenment of the present disclosure, a person of ordinary skills in the art may make many forms without departing from the aims of the present disclosure and the protection scope of claims, all of which fall within the protection of the present disclosure.

What is claimed is:

1. A data transmission method applied to a communications device, the method comprising:
   using a Hybrid Automatic Repeat Request (HARQ) process corresponding to a target Bandwidth Part (BWP) to transmit data on a semi-persistent scheduling resource in the target BWP,
   wherein HARQ processes respectively corresponding to N BWPs, comprising the target BWP, of a first cell are different, and N is an integer greater than 1;
   wherein before using the HARQ process corresponding to the target BWP to transmit data on the semi-persistent scheduling resource in the target bandwidth part BWP, the method further comprises:
   obtaining a HARQ process ID corresponding to the target BWP according to configuration information of a semi-persistent scheduling resource,
   wherein the configuration information of the semi-persistent scheduling resource comprises:
   a periodicity of the semi-persistent scheduling resource in the target BWP; or
   HARQ configuration information of the semi-persistent scheduling resource in the target BWP:
   wherein obtaining the HARQ process ID corresponding to the target BWP according to the configuration information of the semi-persistent scheduling resource comprises:
   calculating a HARQ process ID available for a semi-persistent scheduling resource in each periodicity in the semi-persistent scheduling resource in the target BWP according to an initial HARQ process ID and a first offset,
   wherein the initial HARQ process ID corresponds to the semi-persistent scheduling resource in the target BWP, and the first offset is determined according to continuous HARQ process IDs configured for the semi-persistent scheduling resource in the target BWP; or
   wherein obtaining the HARQ process ID corresponding to the target BWP according to the configuration information of the semi-persistent scheduling resource comprises:
   calculating a semi-persistent scheduling resource in the target BWP corresponding to a first HARQ process ID according to the initial HARQ process ID and a second offset; and
   calculating the HARQ process ID available for the semi-persistent scheduling resource in each periodicity in the semi-persistent scheduling resource in the target BWP according to the semi-persistent scheduling resource in the target BWP corresponding to the first HARQ process ID, the HARQ configuration information, a periodicity sequence, and a semi-persistent scheduling resource sequence,
   wherein the initial HARQ process ID corresponds to the semi-persistent scheduling resource in the target BWP, and the second offset is determined according to HARQ process IDs configured for the semi-persistent scheduling resource in the target BWP.

2. The data transmission method according to claim 1, wherein the HARQ configuration information comprises:
   a continuous or discrete HARQ process ID; or
   a quantity of HARQ processes available for a semi-persistent scheduling resource in each periodicity.

3. The data transmission method according to claim 1, wherein the quantity of HARQ processes available for a semi-persistent scheduling resource in each periodicity is m, and m is an integer greater than 1; and
   the calculating a HARQ process ID available for a semi-persistent scheduling resource in each periodicity in the semi-persistent scheduling resource in the target BWP according to an initial HARQ process ID and a first offset comprises:
   calculating a HARQ process ID for a first semi-persistent scheduling resource in each periodicity in the semi-persistent scheduling resource in the target BWP according to the initial HARQ process ID and the first offset; and
   calculating a HARQ process ID for an $i^{th}$ semi-persistent scheduling resource in each periodicity in the semi-persistent scheduling resource in the target BWP according to the HARQ process ID for the first semi-persistent scheduling resource in each periodicity, the HARQ configuration information, the periodicity sequence, and the semi-persistent scheduling resource sequence;

wherein i is an integer greater than 1 and less than or equal to m.

4. The data transmission method according to claim 1, wherein the semi-persistent scheduling resource comprises at least one of the following:
   downlink semi-persistent scheduling;
   uplink configured grant type 1;
   uplink configured grant type 2; or
   autonomous uplink.

5. The data transmission method according to claim 4, wherein the semi-persistent scheduling resource comprises the autonomous uplink, the communications device is a terminal, and
   the using a HARQ process corresponding to a target BWP to transmit data on a semi-persistent scheduling resource in the target BWP comprises:
      using the HARQ process of the target BWP to transmit data on the semi-persistent scheduling resource in the target BWP, and
      sending information of the HARQ process of the target BWP to a network-side device.

6. A communications device, comprising a processor, a memory, and a computer program stored in the memory and executable on the processor, wherein the computer program, when executed by the processor, causes the processor to:
   use a HARQ process corresponding to a target BWP to transmit data on a semi-persistent scheduling resource in the target BWP,
   wherein HARQ processes respectively corresponding to N BWPs, comprising the target BWP, of a first cell are different, and N is an integer greater than 1;
   wherein the computer program, when executed by the processor, further causes the processor to:
      obtain a HARQ process ID corresponding to the target BWP according to configuration information of a semi-persistent scheduling resource before using the HARQ process corresponding to the target BWP to transmit the data on the semi-persistent scheduling resource in the target BWP,
      wherein the configuration information of the semi-persistent scheduling resource comprises:
         a periodicity of the semi-persistent scheduling resource in the target BWP; or
         HARQ configuration information of the semi-persistent scheduling resource in the target BWP;
      wherein, to obtain the HARQ process ID corresponding to the target BWP according to the configuration information of the semi-persistent scheduling resource, the computer program, when executed by the processor, further causes the processor to:
         calculate a HARQ process ID available for a semi-persistent scheduling resource in each periodicity in the semi-persistent scheduling resource in the target BWP according to an initial HARQ process ID and a first offset,
         wherein the initial HARQ process ID corresponds to the semi-persistent scheduling resource in the target BWP, and the first offset is determined according to continuous HARQ process IDs configured for the semi-persistent scheduling resource in the target BWP; or
      wherein, to obtain the HARQ process ID corresponding to the target BWP according to the configuration information of the semi-persistent scheduling resource, the computer program, when executed by the processor, further causes the processor to:
         calculate a semi-persistent scheduling resource in the target BWP corresponding to a first HARQ process ID according to the initial HARQ process ID and a second offset; and
         calculate the HARQ process ID available for the semi-persistent scheduling resource in each periodicity in the semi-persistent scheduling resource in the target BWP according to the semi-persistent scheduling resource in the target BWP corresponding to the first HARQ process ID, the HARQ configuration information, a periodicity sequence, and a semi-persistent scheduling resource sequence,
         wherein the initial HARQ process ID corresponds to the semi-persistent scheduling resource in the target BWP, and the second offset is determined according to HARQ process IDs configured for the semi-persistent scheduling resource in the target BWP.

7. The communications device according to claim 6, wherein the HARQ configuration information comprises:
   a continuous or discrete HARQ process ID; or
   a quantity of HARQ processes available for a semi-persistent scheduling resource in each periodicity.

8. The communications device according to claim 6, wherein the quantity of HARQ processes available for a semi-persistent scheduling resource in each periodicity is m, and m is an integer greater than 1;
   wherein, to obtain the HARQ process ID corresponding to the target BWP according to configuration information of the semi-persistent scheduling resource, the computer program, when executed by the processor, further causes the processor to:
      calculate the HARQ process ID available for the semi-persistent scheduling resource in each periodicity in the semi-persistent scheduling resource in the target BWP according to the initial HARQ process ID and the first offset; and
      calculate a HARQ process ID for an $i^{th}$ semi-persistent scheduling resource in each periodicity among the semi-persistent scheduling resources of the target BWP according to a HARQ process ID for a first semi-persistent scheduling resource in each periodicity, the HARQ configuration information, the periodicity sequence, and the semi-persistent scheduling resource sequence,
   wherein i is an integer greater than 1 and less than or equal to m.

9. The communications device according to claim 6, wherein the semi-persistent scheduling resource comprises at least one of the following:
   downlink semi-persistent scheduling;
   uplink configured grant type 1;
   uplink configured grant type 2; and
   autonomous uplink.

10. The communications device according to claim 9, wherein the semi-persistent scheduling resource comprises the autonomous uplink, and the communications device is a terminal; and
   wherein, to use the HARQ process corresponding to the target BWP to transmit data on the semi-persistent scheduling resource in the target BWP, the computer program, when executed by the processor, further causes the processor to:
      use the HARQ process of the target BWP to transmit data on the semi-persistent scheduling resource in the target BWP, and send information of the HARQ process of the target BWP to a network-side device.

11. A non-transitory computer readable storage medium, wherein the computer readable storage medium stores a computer program, and the computer program, when executed by a processor, implements a data transmission method applied to a communications device, the data transmission method comprising:
    using a HARQ process corresponding to a target BWP to transmit data on a semi-persistent scheduling resource in the target BWP,
    wherein HARQ processes respectively corresponding to N BWPs, comprising the target BWP, of a first cell are different, and N is an integer greater than 1;
    wherein before using the HARQ process corresponding to the target BWP to transmit data on the semi-persistent scheduling resource in the target bandwidth part BWP, the method further comprises:
        obtaining a HARQ process ID corresponding to the target BWP according to configuration information of a semi-persistent scheduling resource,
        wherein the configuration information of the semi-persistent scheduling resource comprises:
            a periodicity of the semi-persistent scheduling resource in the target BWP; or
            HARQ configuration information of the semi-persistent scheduling resource in the target BWP:
    wherein obtaining the HARQ process ID corresponding to the target BWP according to the configuration information of the semi-persistent scheduling resource comprises:
        calculating a HARQ process ID available for a semi-persistent scheduling resource in each periodicity in the semi-persistent scheduling resource in the target BWP according to an initial HARQ process ID and a first offset,
        wherein the initial HARQ process ID corresponds to the semi-persistent scheduling resource in the target BWP, and the first offset is determined according to continuous HARQ process IDs configured for the semi-persistent scheduling resource in the target BWP; or
    wherein obtaining the HARQ process ID corresponding to the target BWP according to the configuration information of the semi-persistent scheduling resource comprises:
        calculating a semi-persistent scheduling resource in the target BWP corresponding to a first HARQ process ID according to the initial HARQ process ID and a second offset; and
        calculating the HARQ process ID available for the semi-persistent scheduling resource in each periodicity in the semi-persistent scheduling resource in the target BWP according to the semi-persistent scheduling resource in the target BWP corresponding to the first HARQ process ID, the HARQ configuration information, a periodicity sequence, and a semi-persistent scheduling resource sequence,
        wherein the initial HARQ process ID corresponds to the semi-persistent scheduling resource in the target BWP, and the second offset is determined according to HARQ process IDs configured for the semi-persistent scheduling resource in the target BWP.

12. The non-transitory computer readable storage medium according to claim 11, wherein the HARQ configuration information comprises:
    a continuous or discrete HARQ process ID; or
    a quantity of HARQ processes available for a semi-persistent scheduling resource in each periodicity.

* * * * *